United States Patent [19]
Motz et al.

[11] 3,962,124
[45] June 8, 1976

[54] OXIDATION STABILIZED ORGANIC COMPOSITIONS

[75] Inventors: Kaye L. Motz; Allan J. Lundeen, both of Ponca City, Okla.

[73] Assignee: Continental Oil Company, Ponca City, Okla.

[22] Filed: Mar. 25, 1974

[21] Appl. No.: 454,492

[52] U.S. Cl. .............................. 252/404; 252/52 R; 252/407; 260/45.95 R; 260/619 R
[51] Int. Cl.² .................. C09K 15/08; C10M 1/20; C09K 15/06; C08K 5/05
[58] Field of Search ........................... 252/404, 407; 260/619 R, 45.95

[56] References Cited
UNITED STATES PATENTS

| | | | |
|---|---|---|---|
| 2,515,906 | 7/1950 | Stevens | 260/619 B |
| 2,515,907 | 7/1950 | Stevens | 260/619 B |
| 2,515,908 | 7/1950 | Stevens | 252/404 X |
| 2,515,909 | 7/1950 | Stevens | 252/404 X |
| 2,647,102 | 7/1953 | Ambelang | 260/619 X |
| 3,330,873 | 7/1967 | Godin | 260/619 B |
| 3,347,871 | 10/1967 | Harding | 252/404 X |
| 3,367,981 | 2/1968 | Napolitano | 252/404 X |
| 3,407,147 | 10/1968 | Chew | 252/404 |
| 3,689,572 | 9/1972 | Ruppert | 260/619 B |

*Primary Examiner*—Benjamin R. Padgett
*Assistant Examiner*—Donald P. Walsh
*Attorney, Agent, or Firm*—Cortlan R. Schupbach, Jr.

[57] ABSTRACT

The use of a condensation reaction product of (1) meta-cresol, para-cresol or a mixture of meta and para cresols, and (2) an aldehyde defined by R-CHO wherein R is hydrogen or an alkyl group having at least 1 carbon atom as an antioxidant in organic compositions.

6 Claims, No Drawings

OXIDATION STABILIZED ORGANIC COMPOSITIONS

This invention relates to organic compositions having improved oxidative stability. More particularly, the invention relates to the use of certain condensation reaction products as antioxidants for organic compositions such as lubricating oils, rubber, polymers; e.g., polypropylene, and the like.

Oxidative deterioration of various organic compositions has long been recognized as a problem and, as a result, a great deal of effort has been expended in the art in developing suitable antioxidants to inhibit such deterioration. Among the many antioxidants which have been developed are the bis phenols and it has generally been understood that, to be most effective, these bis phenols should be hindered. Examples of such hindered phenols and 2,2'-methylene bis (4-methyl-6-t-butyl phenol) and 4,4'methylene bis (2-methyl-6-t-butyl phenol). Such hindered bis phenols have been produced by condensing a hindered phenol with an aliphatic aldehyde, U.S. Pat. No. 2,515,907 and U.S. Pat. No. 2,647,102.

In accordance with the invention, it has been found that condensation reaction products of certain non-hindered phenols with aliphatic aldehydes are effective antioxidants for various organic compositions. Not only are these reaction products effective antioxidants but they also are non-staining. Briefly described, the antioxidant condensation reaction products are derived from a non-hindered cresol and an aliphatic aldehyde.

The cresol reactants used in preparing the antioxidant condensation reaction products are m-cresol, p-cresol or a mixture of m- and p- cresols. Compared to each other, m-cresol provides higher antioxidant effectiveness than p-cresol in the reaction products. The above cresol reactants may also contain minor amounts of o-cresol, various xylenol isomers and phenol. By minor amount is meant that amount which does not unduly interfere with obtaining the antioxidant benefits of the invention, usually not more than about 20–25 percent by weight.

The aliphatic aldehydes suitable for use may be defined as R-CHO wherein R is hydrogen or an alkyl group having at least 1 carbon atom. The number of carbon atoms is not believed important from an antioxidant standpoint. However, the physical characteristics of the reaction product will vary from a solid or semi-solid form with a lower aldehydes to a liquid or semi-liquid form with the higher aldehydes. Solubility in organic compositions will also vary with the aldehyde; generally, increasing solubility is obtained with increasing carbon content of the aldehyde. From a practical view, the aldehyde will generally vary from 1 to about 44 carbon atoms for most purposes. Most preferably, the aldehyde will generally vary from 1 to 9 carbon atoms when the reaction products are used as antioxidants in polymers; e.g., polyolefins and rubber, and aldehyde will vary from 5 to 9 carbon atoms when the reaction products are used as antioxidants in organic oils such as lubricating oils.

Illustrative of the preferred aldehydes are butyraldehyde, heptanal, propionaldehyde, isobutyraldehyde, 2-ethylhexanal, acetaldehyde, formaldehyde and the like.

The condensation reaction is carried out in accordance with procedures known in the art such as generally shown in U.S. Pat. No. 2,647,102 and U.S. Pat. No. 2,515,907. For example, the cresol and aldehyde reactants may be condensed using conventional acid or strong basic catalysis. It is generally desirable to use a mol ratio of aldehyde to cresol of at least 1/1, preferably in the range of 1/2 to 1/4. For a given aldehyde, ratios above about 1/2 seem to provide a reaction product having better solubility in organic compositions such as oils. This may be of concern depending upon intended use. Mol ratios higher than 1/4 may be employed; e.g., as high as 1/10 or higher, but the excess cresol reactant then essentially serves as a diluent for the reaction system.

While not required, suitable inert diluents may be employed. Examples of such diluents include benzene, toluene, xylenes, paraffins, and the like. Diluents may be advantageous in aiding to maintain reaction temperatures and aiding in removal of water of reaction.

Pressure is not critical and can be atmospheric or below to 1000 psi or higher. Atmospheric pressure is preferred for convenience. The pressure should be sufficient to maintain the cresol and aldehyde reactants in the liquid phase.

Temperatures are suitably in the range of about 50°C to about 150°C, preferably in the range of about 75°C to 125°C. Temperatures below 50°C are undesirable as the rate of reaction is unduly slow. Temperatures can be used above 200°C, the only concern being degradation of the materials.

The acid catalysts which may be employed include hydrogen, halide; e.g., HCl, sulfuric acid, phosphoric acid, aluminum chloride, ferric chloride, oxalic acid, acetic acid.

The reactants together with the catalyst and any diluent which may be employed may be charged to a reactor and reacted under conditions outlined above. Water of reaction, together with any that may have been introduced with the initial charge, is removed during the course of reaction to drive the condensation to completion. Most conveniently, this may be done by distillation overhead although other techniques known in the art could also be used. The condensation is essentially complete when no further water of reaction occurs. The crude reaction product mixture may then be cooled, neutralized, and water washed to remove the catalyst, dried, followed by stripping to remove excess cresol reactant, any unreacted materials, and any diluent that may have been used.

The resulting condensation reaction product may be in a solid, semi-solid, semi-liquid or liquid form, depending on the particular aldehyde or aldehydes employed. These reaction products may be employed as such in stabilizing organic compositions against oxidative deterioration. Additionally, they may be employed in solvent solution. If it is desirable to employ the liquid or semi-liquid reaction products in a solid form, it is possible to blend them with an inert absorbent granular or powdery material such as diatomaceous earth or one may add formaldehyde to the reaction product and subject the mixture to post condensation conditions whereby a hard, solid resinous product is obtained having similar antioxidant properties to the initial reaction product.

For stabilizing organic compounds against oxidative degradation, a stabilizing amount of the reaction product or its equivalent is used. Usually an amount in the range of about 0.05 to 5 percent by weight will suffice.

The following examples illustrate the preparation of the antioxidant condensation reaction products:

EXAMPLE 1

A 500 ml, 3-necked flask equipped with a magnetic stirrer, a thermometer, and a Dean-Stark trap was charged with 216 g of a mixture of meta and paracresols (60%/40%), 72 g of distilled butyraldehyde and 0.15 g of sulfuric acid (conc). The reaction was then heated by a heat lamp to a temperature of about 115°C whereat water began to collect in the trap. Stirring and heating are continued until no further water is collected for a period of about 15 minutes. The temperature had risen to 219°C and a total of about 16.2 ml collected water was noted.

After cooling to 125°C, the crude reaction product was passed through a bed of 10 g of 8-mesh alumina to remove the catalyst. The temperature of the reaction product was maintained sufficiently high to keep the product in a fluid state. The neutralized reaction product was then transferred to a round-bottom flask and vacuum stripped at 0.01 mm and 125°C to remove excess cresol. The resulting warm viscous liquid was cooled to form a hard, glossy product which was dark red in color.

EXAMPLE 2

The general procedure outlined in Example 1 was followed using 2.3 mols of butyraldehyde and 4.6 mols of a 60/40 mixture of meta and para- cresol as the reactants, about 460 ml benzene as a diluent and about 0.03 weight percent conc $H_2SO_4$ catalyst. The mixture was refluxed until no further water was collected and the reaction product was recovered in the manner described in Example 1 except that the benzene diluent was stripped prior to vacuum stripping.

EXAMPLE 3

A one-liter, 3-necked flask equipped as described in Example 1 was charged with 3 mols (324 g) of a commercially available meta-para cresol, 1 mol (72 g) of butyraldehyde and 120 μl of conc $H_2SO_4$. The commercial cresol analyzed about 84.7 percent meta-para cresol (42.8 percent meta, 57.2 percent para), 0.3 percent phenol, 0.5 percent o-cresol, 11.2 percent xylenols, 2.4 percent trimethyl phenols and 0.9 percent o-ethyl phenol. The mixture was heated to about 116°C at which point water began to collect in the top. Heating was continued for about 2 hours during which about 15 ml of water was collected with no water collected during the last 15 minutes. The temperature at this point had risen to 200°C.

The crude reaction mixture was cooled to 100°C and passed through a bed of 30 g of 8-mesh alumina to remove the sulfuric acid. The resulting mixture was vacuum stripped to remove unreacted cresol. Further cooling gave a reaction product which hardened to a glassy solid.

EXAMPLE 4

The procedure of Example 3 was followed in preparing antioxidant condensation reaction products using the following materials:

(a) 1 mol 60/40 mixture of meta and para- cresols
 0.5 mol heptanal
 100 ml benzene
 0.4 weight percent $H_2SO_4$ (conc)
(b) 1 mol 60/40 mixture of meta and para- cresols
 0.425 mol butyraldehyde
 0.075 mol heptanal
 100 ml benzene
 0.03 weight percent $H_2SO_4$ (conc)
(c) 1 mol 60/40 mixture of meta and para- cresols
 0.5 mol 2-ethyl-hexanal
 100 ml benzene
 0.4 weight percent $H_2SO_4$ (conc)
(d) 4.6 mol 60/40 mixture of metal and para- cresols
 2.3 mol isobutyraldehyde
 460 ml benzene
 0.03 weight percent $H_2SO_4$ (conc)
(e) 1 mol meta- cresol
 0.5 mol butyraldehyde
 100 ml benzene
 0.4 weight percent $H_2SO_4$ (conc)
(f) 1 mol para- cresol
 0.5 mol butyraldehyde
 100 ml benzene
 0.4 weight percent $H_2SO_4$ (conc)
(g) 1 mol mixed cresols (54 percent meta, 29 percent para, 17 percent other phenols - Eastman Tech Grade)
 0.5 mol butyraldehyde
 100 ml benzene
 0.03 weight percent $H_2SO_4$ (conc)
(h) 1 mol 60/40 mixture of meta and para- cresols
 0.5 mol butyraldehyde
 100 ml benzene
 0.03 weight percent $H_2SO_4$ (conc)
(i) 1 mol 60/40 mixture of meta and para-cresols
 0.5 mol butyraldehyde
 0.03 weight percent $H_2SO_4$ (conc)

EXAMPLE 5

The procedure of Example 3 was followed using 1 mol 60/40 mixture of meta and para- cresols, 0.5 mol butyraldehyde, 100 ml benzene and 0.03 weight percent $H_2SO_4$ (conc). After the condensation reaction was completed and cooling to 50°C (a liquid solution in benzene), 0.1 of formaldehyde (paraformaldehyde) was added and, with heating, further reaction proceeded until no water was collected. The product was recovered in the same manner as Example 3 and was a hard, glossy material which could be ground to a fine, free-flowing powder.

The condensation reaction products were evaluated for their antioxidant properties as illustrated in the following examples.

EXAMPLE 6

A series of tests were conducted on the oxidation stability of 170 pale oil using the rotating bomb test designated ASTM D-2272-67. In this series of tests, a control sample of pale oil without any anti-oxidant along with several pale oil samples containing 0.5 weight percent antioxidant. The following table outlines the samples tested and the test results.

TABLE A

Pale Oil with 0.5 Percent Antioxidant

| Antioxidant | Sample Bomb Life (Min) |
|---|---|
| Control (None) | 18 |
| Commercial Antioxidants | |
| Di-t-butyl-p-cresol | 170–200 |
| 4,4'-Methylene-bis(2,6-di-t-butyl phenol) | 75–125 |
| Condensation Reaction Products | |

| No.[a] | Cresol[b] | Aldehyde | |
|---|---|---|---|
| 1 | m,p | butyraldehyde | 285 |
| 2 | m,p | butyraldehyde | 335 |
| 3 | m,p | butyraldehyde | 225 |
| 4 | m,p | butyraldehyde | 325 |
| 5 | m,p | butyraldehyde | 320 |
| 6 | m,p | butyraldehyde | 340 |
| 7 | m,p | butyraldehyde | 275 |
| 8 | m,p | heptanal | 265 |

TABLE A-continued

Pale Oil with 0.5 Percent Antioxidant

| | | | |
|---|---|---|---|
| 9 | m,p | heptanal | 95 |
| 10 | m,p | heptanal | 235 |
| 11 | m,p | isobutyraldehyde | 335 |
| 12 | m,p | 2-ethyl hexanal | 235 |
| 13 | m | butyraldehyde | 395 |
| 14 | p | butyraldehyde | 335 |
| 15 | o | butyraldehyde | 275 |
| 16 | m,p | butyraldehyde and heptanal | 330 |
| 17 | m,p | butyraldehyde and heptanal (mol ratio .475/.025) | 535 |
| 18 | m,p | butyraldehyde and heptanal (mol ratio .45/.05) | 425 |
| 19 | m,p | butyraldehyde and heptanal (mol ratio .4/.1) | 375 |
| 20 | m,p | butyraldehyde and heptanal (mol ratio .375/.125) | 295 |
| 21 | m,p | butyraldehyde and heptanal (mol ratio .35/.15) | 360 |
| 22 | m,p | butyraldehyde and heptanal (mol ratio .3/.2) | 375 |
| 23 | m,p | butyraldehyde and heptanal (mol ratio .3/.2) | 325 |
| 24 | m,p | butyraldehyde | 390 |
| 25 | m,p | butyraldehyde | 385 |
| 26 | m,p | butyraldehyde | 395 |
| 27 | m,p | butyraldehyde and heptanal (mol ratio .45/.05) | 310 |
| 28 | m,p | butyraldehyde and 2-ethyl hexanal (mol ratio .45/.05) | 445 |
| 29 | m,p | butyraldehyde and 2-ethyl hexanal (mol ratio .45/.05) | 460 |
| 30 | m,p | butyraldehyde and 2-ethyl hexanal (mol ratio .4/.1) | 425 |
| 31 | m,p-1 | butyraldehyde | 555 |
| 32 | | commercial butyraldehyde | 480 |

*Runs 1–9 and 16–22 prepared by procedure in Example 4(b)
Runs 10–14 prepared by procedure in Example 4(c)
Run 15 prepared by procedure in Example 4(b)
Runs 23–30 prepared by procedure in Example 4(i)
$^b$m,p is a 60/40 mixture of meta and para- cresols
m is meta- cresol
p is para- cresol
o is ortho- cresol
m,p-1 is a 43/57 mixture of meta and para- cresols
$^c$cresol is same as used in Example 3
Note -- the above data are representative of numerous tests carried out.

EXAMPLE 7

A series of tests were conducted on the oxidation stability of rubber (50/50 SBR and natural rubber) as reflected by percent retention of physical properties after aging. The rubber masterbatch tested comprised 50 parts natural rubber, 50 parts SBR, 2 parts stearic acid, 4 parts zinc oxide, 50 parts carbon black, 1 part accelerator and 2 parts sulfur. Samples containing various antioxidants including a control without any antioxidant were prepared and tested in accordance with ASTM D-412 and D-572-67:

TABLE B

Rubber Aging — Percent Retention of Physical Properties

| | | OVEN AGING ASTM D-573-67 & D-412 | | | | | | | OXYGEN BOMB ASTM-D- 572-67 | | |
|---|---|---|---|---|---|---|---|---|---|---|---|
| | | 250°F | | | | 212°F | | | | 158°F | | |
| | Conc | 24 HRS | | 48 HRS | | 48 HRS | | 96 HRS | | 96 HRS | | Total |
| Antioxidant | % | Elong | Tens | Elong | Tens | Elong | Tens | Elong | Tens | Elong | Tens | Score$^5$ |
| Control (none) | | 24 | 28 | 19 | 17 | 38 | 56 | 26 | 41 | 47 | 33 | 329 |
| Phenylenediamine mixture$^1$ | 1 | 39 | 58 | 31 | 53 | 49 | 75 | 39 | 69 | 69 | 75 | 557 |
| Phenyl- -naphthylamine | 1 | 37 | 63 | 29 | 49 | 49 | 76 | 35 | 57 | 75 | 73 | 543 |
| 4,4'-butylidene-bis(6-t-butyl-p-cresol) | 1 | 39 | 59 | 30 | 52 | 50 | 71 | 39 | 58 | 55 | 50 | 503 |
| Butylidene-bis(butyl-m,p-cresol) | 1 | 34 | 56 | 25 | 43 | 53 | 75 | 38 | 54 | 59 | 47 | 484 |
| Reaction Product A$^2$ | 1 | 36 | 64 | 25 | 44 | 52 | 82 | 41 | 71 | 59 | 49 | 523 |
| Reaction Product B$^3$ | 1 | 34 | 68 | 24 | 46 | 39 | 58 | 39 | 64 | 53 | 47 | 472 |
| Trisphenol$^4$ | 1 | 41 | 70 | 32 | 63 | 51 | 69 | 31 | 58 | 54 | 44 | 519 |

Footnotes
$^1$Mixture of ⅔ N-(1,3-dimethylbutyl)-N'-phenyl-p-phenylenediamine and ⅓ N,N'-bis-(1,4-dimethylpentyl)-p-phenylenediamine
$^2$Reaction product of 4.6 mol of 60/40 mixture of meta and para- cresol and 2.3 mol butyraldehyde using 0.03 weight percent $H_2SO_4$ (conc) as described in Example 3
$^3$Reaction product of 4.6 mol of 60/40 mixture of meta and para- cresol and 2.3 mol isobutyraldehyde using 0.03 weight percent $H_2SO_4$ (conc) per procedure in Example 3
$^4$Trisphenol derived from 6-t-butyl-o-cresol and acrolein
$^5$The figures in this column reflect the sum of the percentages in the preceding columns

EXAMPLE 8

Another series of tests were conducted on the oxidative stability of rubber in the same manner described in Example 7. The following table sets forth the antioxidants evaluated and the test results:

TABLE C

Rubber Aging — Percent Retention of Physical Properties

| | | OVEN AGING ASTM D-573-67 & D-412 | | | | | | | OXYGEN BOMB ASTM-D- 572-67 | | |
|---|---|---|---|---|---|---|---|---|---|---|---|
| | | 250°F | | | | 212°F | | | | 158°F | | |
| | Conc | 24 HRS | | 48 HRS | | 48 HRS | | 96 HRS | | 96 HRS | | Total |
| Antioxidant | | Elong | Tens | Elong | Tens | Elong | Tens | Elong | Tens | Elong | Tens | Score$^4$ |
| Control (none) | | 22 | 21 | 12 | 16 | 46 | 51 | 38 | 44 | 42 | 22 | 314 |
| Phenylenediamine mixture$^1$ | 1 | 31 | 36 | 25 | 28 | 56 | 71 | 37 | 46 | 67 | 61 | 458 |
| Reaction Product C$^2$ | 1 | 27 | 31 | 20 | 25 | 55 | 73 | 43 | 58 | 52 | 33 | 417 |
| Reaction Product D$^3$ | 1 | 28 | 29 | 19 | 21 | 56 | 66 | 44 | 52 | 56 | 30 | 401 |

TABLE C-continued

Rubber Aging — Percent Retention of Physical Properties

| Antioxidant | Conc | OVEN AGING ASTM D-573-67 & D-412 | | | | | | | | OXYGEN BOMB ASTM-D-572-67 158°F | | Total Score[4] |
| --- | --- | --- | --- | --- | --- | --- | --- | --- | --- | --- | --- | --- |
| | | 250°F | | | | 212°F | | | | | | |
| | | 24 HRS | | 48 HRS | | 48 HRS | | 96 HRS | | 96 HRS | | |
| | | Elong | Tens | Elong | Tens | Elong | Tens | Elong | Tens | Elong | Tens | |
| Reaction Product E | 1.3 | 30 | 33 | 23 | 24 | 58 | 75 | 47 | 63 | 59 | 35 | 447 |

Footnotes

[1] Mixture of ⅔ N-(1,3-dimethylbutyl)-N'-phenyl-p-phenylenediamine and ⅓ N,N'-bis-(1,4-dimethylpentyl)-p-phenylenediamine

[2] Reaction product of 2 mol 60/40 mixture of meta and para- cresols and 1 mol butyraldehyde using 1 weight percent $H_2SO_4$ (conc) and 200 ml benzene diluent

[3] Reaction product of 50 mols 60/40 mixture of meta and para- cresols and 25 mols butyraldehyde using 0.05 weight percent $H_2SO_4$ (conc) and 5 l benzene diluent

[4] The figures in this column reflect the sum of the percentages in the preceding columns

EXAMPLE 9

A series of tests were carried out on the oxidative stability of a conventionally refined paraffinic petroleum based oil having typical properties of flash point — 400°F, pour point − 0° to 10°F, and SUS viscosity at 210°F of 43–45 and at 100°F of 145–170. Two commercial antioxidants and a reaction product of m,p-cresols and butyraldehyde were evaluated in accordance with ASTM D-943. The results are indicated in the following table.

TABLE D

Paraffinic Oil Containing 0.5 Percent Antioxidant

| Antioxidant | Stability Life (hrs) |
| --- | --- |
| Di-t-butyl-p-cresol | 800–1000 |
| 4,4'-methylene-bis(2,6-di-t-butylphenol) | 500– 800 |
| Reaction Product E[1] | 2200+ |

[1] Reaction product of 2 mols 60/40 mixture of meta and para- cresols and 1 mol of butyraldehyde using 1 weight percent $H_2SO_4$ (conc) and 200 ml benzene diluent

EXAMPLE 10

Following the procedure of Example 1, 108 g (1 mol) of a mixture of meta and para- cresols (60 percent/40 percent), 15 g (0.5 mol) of paraformaldehyde, 0.075 g conc sulfuric acid and 100 ml benzene were charged to the reaction flask. The condensation reaction was carried out at reflux of about 60°C until no further water was collected. The reaction product was worked by passing through an alumina bed followed by hot and vacuum stripping to remove the benzene and excess cresols. The resulting recovered reaction product was a hard, glassy solid.

Since the reaction product was a solid and essentially insoluble in hydrocarbon oils, it has no practical use in inhibiting oxidation of oils. However, it was ground and tested in an SBR rubber formulation and found to be an effective antioxidant.

EXAMPLE 11

A further series of tests were conducted on the oxidation stability of a commercial motor oil in accordance with the Sequence III-C test of ASTM STP 315F. The motor oil employed was essentially an SAE 30 grade without a supplemental antioxidant. Tests were run on this oil which served as the control and also on the same motor oil to which had been added 1.14 percent of a 50 percent xylene solution of a reaction product of mixture of meta and para- cresols and butyraldehyde and designated as 968-L. The reaction product was prepared from 50 mols of 60/40 mixture of meta and para-cresols and 0.25 mol of butyraldehyde using 0.05 percent $H_2SO_4$ (conc) and 5 l benzene as diluent. The percent viscosity increase results of the tests are shown in the following table.

TABLE E

| Elapsed Time | PERCENT VISCOSITY INCREASE | |
| --- | --- | --- |
| | Control | 968-L |
| 8 | 19.9 | 25 |
| 16 | 30.7 | 38.1 |
| 24 | 41.9 | 49.9 |
| 32 | 192.7 | 61.2 |
| 40 | 2193 | 105.3 |
| 48 | (terminated) | 294.6 |
| 56 | | 585.4 |
| 64 | | 1455 |

EXAMPLE 12

Oxidative stability was evaluated on a polypropylene sample (A) containing n-octadecyl-3,5-di-t-butyl-4-hydroxy-phenyl acetate (Irganox 1076, a known commercial antioxidant and a polypropylene sample (B) containing DSTDP and a reaction product of 0175 mol of a 60/40 mixture of meta and para- cresols and 075 mol of heptanol using 003 weight percent $H_2SO_4$ (conc) and 75 ml benzene as diluent. Each sample contained the same level of DSTDP and 0.03 percent of either the reaction product or Irganox 1076. The samples (A) and (B), were oven aged at 150°C for 24 hours. Visual inspection indicated about the same degree of crazing and discoloration.

This, having described the invention in detail it will be understood by those skilled in the art that certain variations and modifications may be made without departing from the spirit and scope of the invention disclosed herein and defined in the appended claims.

We claim:

1. The use of a condensation reaction product of (1) a nonhindered phenol selected from the group consisting of: meta- cresol, para- cresol or a mixture of meta and para cresols, and (2) an aldehyde defined by R-CHO wherein R is hydrogen or an alkyl group having at least 1 carbon atom, as an antioxidant in organic compositions.

2. An organic composition containing an oxidation inhibiting amount of a condensation reaction product of (1) a nonhindered phenol selected from the group consisting of: meta- cresol, para- cresol or a mixture of meta and para cresols, and (2) an aldehyde defined by R-CHO wherein R is hydrogen or an alkyl group containing at least 1 carbon atom.

3. The invention of claim 1 wherein (1) is a mixture of meta- and para- cresols.

4. The invention of claim 3 wherein R is hydrogen or an alkyl group having 1 to 9 carbon atoms.

5. The invention of claim 4 wherein R is an alkyl group having 5 to 9 carbon atoms.

6. The invention of claim 2 wherein the condensation reaction product is used in an amount 0.05 to 5 percent by weight.

* * * * *

UNITED STATES PATENT OFFICE
CERTIFICATE OF CORRECTION

PATENT NO. : 3,962,124
DATED : June 8, 1976
INVENTOR(S) : Kaye L. Motz and Allan J. Lundeen It is certified that error appears in the above-identified patent and that said Letters Patent are hereby corrected as shown below:

Column 1, line 19 - delete "and" and insert ---are---

Column 8, line 41 - delete "075" and insert ---0.75---

Column 8, line 42 - delete "003" and insert ---0.03---

Column 8, line 49 - delete "This" and insert ---Thus---

Signed and Sealed this

Fourteenth Day of September 1976

[SEAL]

Attest:

RUTH C. MASON
Attesting Officer

C. MARSHALL DANN
Commissioner of Patents and Trademarks